Figure 1:
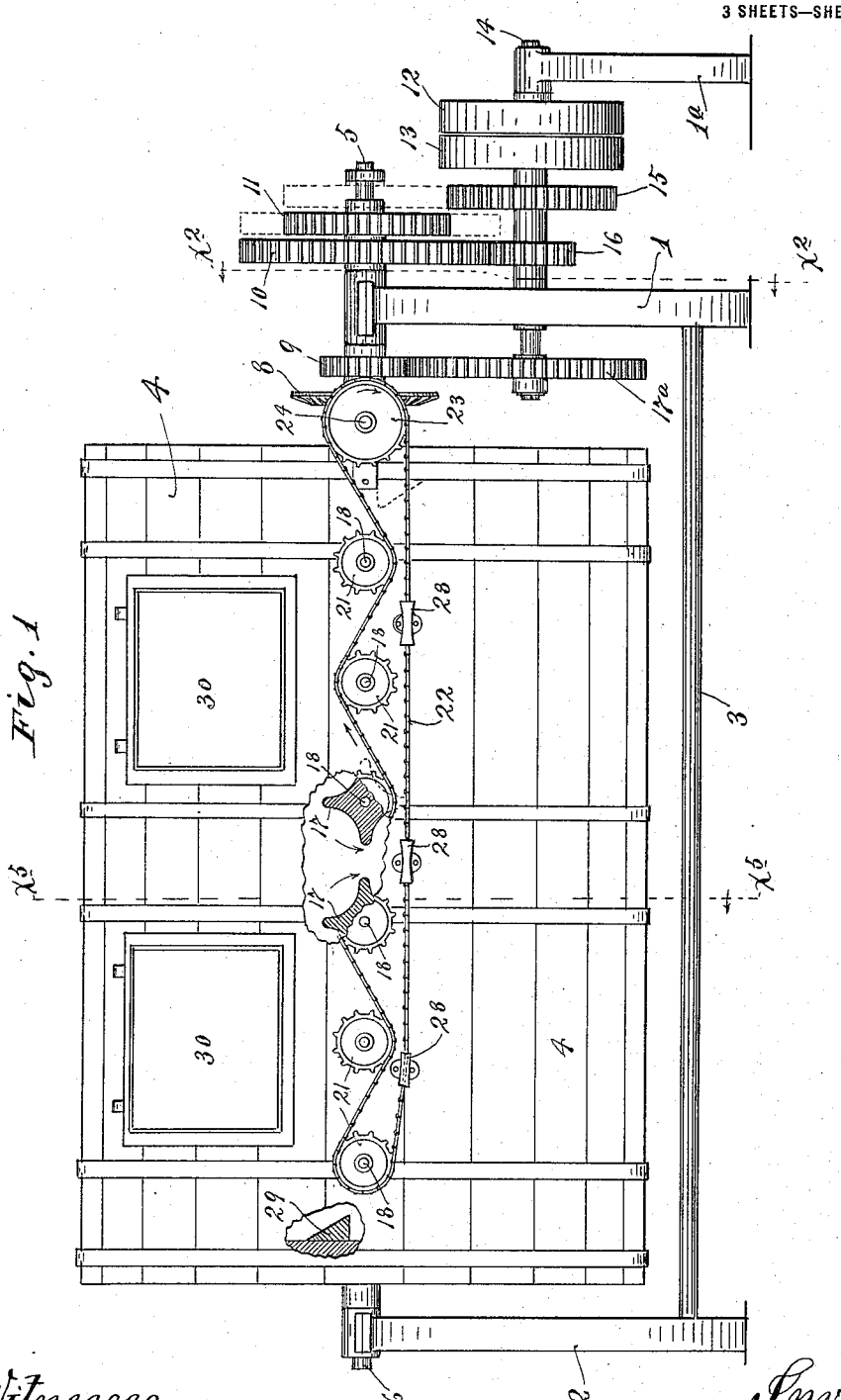

L. VIRTUE.
COMBINED CHURN AND BUTTER WORKER.
APPLICATION FILED FEB. 1, 1915. RENEWED FEB. 3, 1916.

1,196,906.

Patented Sept. 5, 1916.
3 SHEETS—SHEET 1.

Witnesses.
A. H. Opsahl.
E. C. Skinkle

Inventor.
Leonard Virtue
By his Attorneys

L. VIRTUE.
COMBINED CHURN AND BUTTER WORKER.
APPLICATION FILED FEB. 1, 1915. RENEWED FEB. 3, 1916.

1,196,906.

Patented Sept. 5, 1916.
3 SHEETS—SHEET 2.

Witnesses.
A. H. Opsahl
E. C. Skinkle

Inventor
Leonard Virtue
By his Attorneys
Williamson & Merchant

L. VIRTUE.
COMBINED CHURN AND BUTTER WORKER.
APPLICATION FILED FEB. 1, 1915. RENEWED FEB. 3, 1916.

1,196,906.

Patented Sept. 5, 1916.
3 SHEETS—SHEET 3.

Witnesses
A. H. Opsahl.
E. C. Skinkle

Inventor.
Leonard Virtue
By his Attorneys
Williamson & Merchant ical section taken approximately on the line $X^5$ $X^5$ of Fig. 1.
UNITED STATES PATENT OFFICE.

LEONARD VIRTUE, OF OWATONNA, MINNESOTA.

COMBINED CHURN AND BUTTER-WORKER.

1,196,906.

Specification of Letters Patent.

Patented Sept. 5, 1916.

Application filed February 1, 1915, Serial No. 5,400. Renewed February 3, 1916. Serial No. 76,069.

*To all whom it may concern:*

Be it known that I, LEONARD VIRTUE, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention relates to combined churns and butter workers, and has for its object to improve the same in the several particulars hereinafter noted.

Generally stated, the invention consists of novel devices and combinations of devices hereinafter described and defined in the claims.

In combined churns and butter workers of the type wherein horizontally disposed rotary drums are employed, it has been a common practice to provide the drums with internal working rollers and lifting shelves or flights, extended longitudinally of the drum or parallel to the axis thereof. In such arrangements the flights or shelves raise the butter to a considerable elevation and then deliver the same to the butter working rollers.

In the very large churns and butter workers now very generally used in creameries, a very great bulk of butter, frequently weighing as much or more than one thousand pounds, will be handled at one working; and it is obvious that very great power is required to lift such bulk of butter over and over again in the act of delivering the same to the working rollers. Furthermore, as this load is intermittently applied it is very hard on gears or other forms of transmission mechanism. Moreover, the butter working action is, by no means, continuous or steady throughout the rotation of the drum. Also, with the said old arrangement above just indicated, the grain of the butter is greatly damaged and the butter is "smeared" by sliding movements off from the lifting shelves, by scraping action between the shelves and rollers, and by dropping of the butter through a considerable distance back on the bottom of the drum.

My invention overcomes the above noted defects, by a novel arrangement of the working rollers, to-wit: by arrangement of the rollers in one or more series or sets, spaced apart longitudinally of the drum with their axes extended toward the axis of the drum. The outer ends of these rollers work close to the shell of the drum and their inner ends terminate preferably a considerable distance outward of the axis of the drum.

A combined churn and butter worker embodying my invention is illustrated by the accompanying drawings, wherein like characters indicate like parts throughout the several views.

Figure 2:
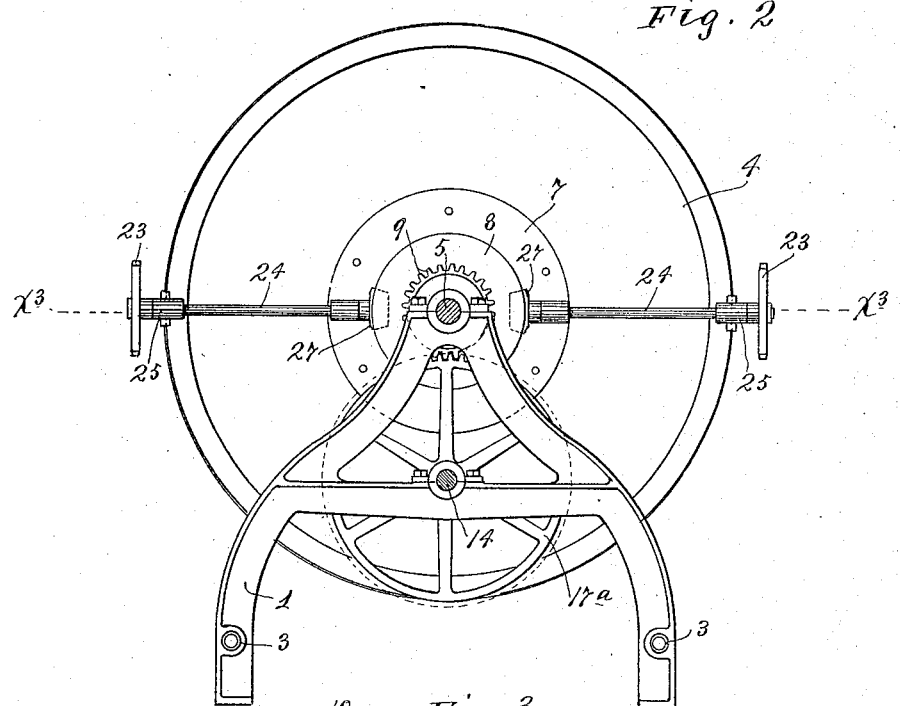
Figure 3:
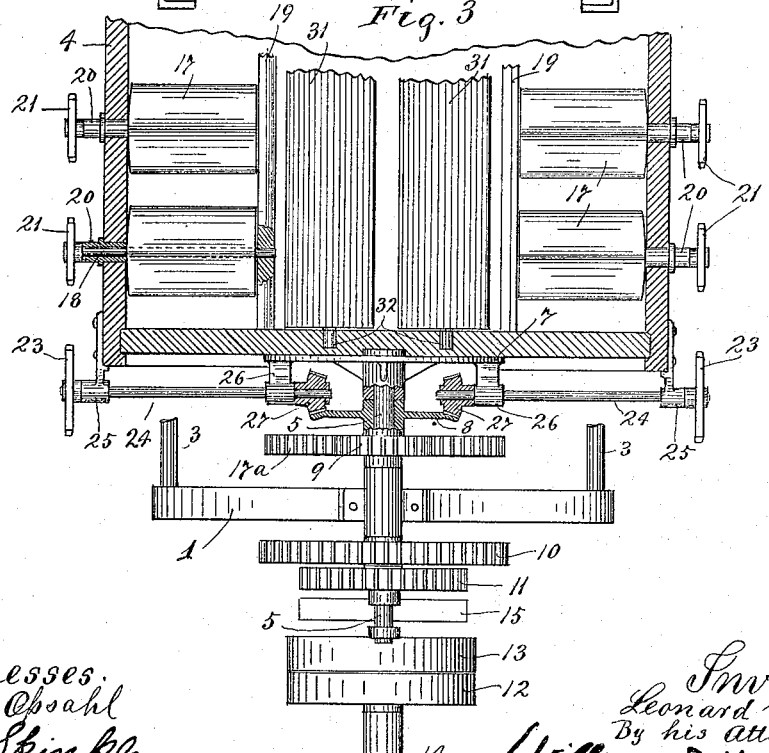
Figure 4:
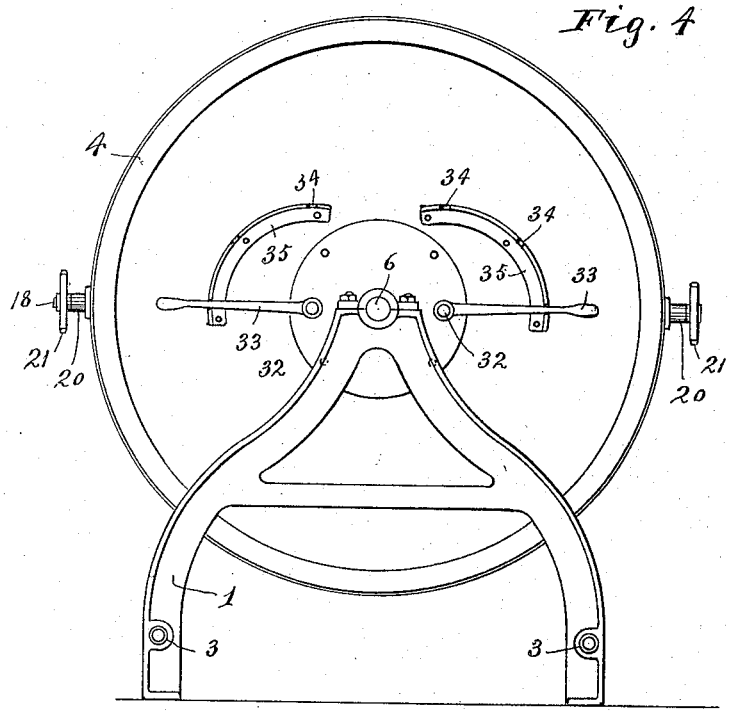
Figure 5:
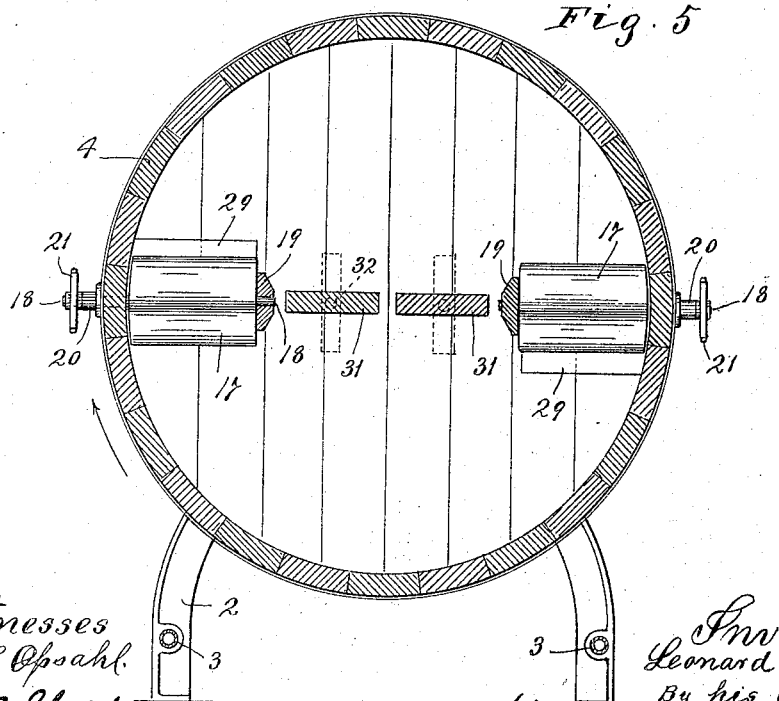

Referring to the drawings: Figure 1 shows the improved churn and butter worker in side elevation, some parts being broken away; Fig. 2 is a section taken on the line $X^2$ $X^2$ of Fig. 1; Fig. 3 is a view partly in plan, but with some parts sectioned on line $X^3$ $X^3$ of Fig. 2, and with some parts broken away; Fig. 4 is a rear elevation of the machine; and Fig. 5 is a vertical section taken approximately on the line $X^5$ $X^5$ of Fig. 1.

The machine frame, as shown, is made up of front and rear pedestal brackets 1 and 2, connected by tie rods or bars 3. The drum 4 is provided with axially projecting shafts 5 and 6 and are journaled respectively in the brackets 1 and 2. The said shaft 5 is rigidly secured in the hub of a plate 7 that is rigidly secured to the adjacent head of the drum. A bevel gear 8, and a connected spur gear 9 are loosely mounted on the shaft 5 between the front end bracket 1 and the hub of the said plate 7. Two spur gears 10 and 11, the former of which is larger than the latter, are keyed to rotate with, but mounted for sliding movements on, the projecting end of the shaft 5.

Power for driving the machine is transmitted to a belt, not shown, and which is arranged to run upon either an idle pulley 12, or a fixed pulley 13, of a countershaft 14, that is journaled in the pedestal 1 and in a supplemental pedestal 1ª. This countershaft 14 carries three spur gears 15, 16 and 17ª. The gear 16 is the smallest of the three, and, in fact, might be designated as a pinion. The gear 17ª is always enmeshed with the pinion 9; and here it may be noted that the said pinion 9 and beveled spur gear 8 are secured to a common hub, and both free to rotate on the shaft 5. When the gears 10—11 are adjusted as shown by full lines in Fig. 1, a relatively low speed, such as desired in working the butter, is imparted to the drum through the gears 10 and 16. When the gears 10 and 11 are shifted to the right, as shown by dotted lines in Fig. 1, gear 10 will be disengaged from gear 16, and gear 11 will be engaged with gear 15, thereby imparting to the drum rotation at a relatively high speed, as required in churning.

In the preferred form of the churn and butter worker, I employ two series of longitudinally spaced radially disposed working rollers 17, which are located diametrically opposite to each other. These rollers 17 have shafts 18, the inner ends of which are journaled in bars 19 that extend parallel to the axis of the drum, and are secured at the ends to the heads of the drum. The outer ends of the shafts 18 project outward through journaled bearings 20, that are secured to the shell of the drum. Sprockets 21 are secured to the outer ends of the several roller shafts 18. Sprocket chains 22 are passed over the alternate sides of the sprockets 21 and over driving sprockets 23 that are secured to the outer end of radial shafts 24. These radial shafts 24 are journaled in bearings 25 and 26, secured on the front end of the drum and on the plate 7 of the adjacent drum head. At the inner ends, the shafts 24 are provided with beveled pinions 27 that mesh with the bevel gear 8 at diametrically opposite points. As shown in Fig. 1, one run of the chain 22 is passed through chain guards 28 on the exterior of the drum. The heads of the drum are shown as provided with beveled cleats 29, located adjacent to the end members of the rollers 17. The drum is shown as provided with two door openings closed by doors 30, of the usual or any suitable construction.

In the space between the roller supporting bars 19 I preferably provide a pair of shelf boards 31, which at the intermediate portions of their ends, are provided with trunnions 32, journaled in the drum heads. The trunnions 32 at the rear of the drum project through the rear drum head, and are provided with levers 33 that are adapted to be sprung into and out of engagement with notches 34 of lock segments 35 which are secured to the adjacent drum head. By means of the levers and lock segments the boards 31 may be secured either in positions indicated by full or dotted lines in Fig. 5, or they may be set in intermediate positions. Both in the churning and butter working actions, it would probably be advisable to set the same in the dotted line positions.

The machine may be operated either as a churn or as a butter worker when rotated in either direction, but let it be assumed that it is being rotated in the direction of the arrow marked on Fig. 5, and is being used to work the butter. It is evident that the working rollers will begin their action on the butter at a time before they reach the extreme lower-most portion of the drum and will continue to work the butter between adjacent reversely driven rollers throughout their upward movement and until all of the butter has been passed downward between the said upwardly moving rollers. In fact, with any bulk of butter obtainable from a proper charge of cream all of the butter will usually be worked backward and downward between said rollers by the time they reach a horizontal line with the axis of the drum. Hence, the bulk of butter is not raised to any great extent from the bottom of the drum, but is fed backward between the rollers by a continuous action, and without lifting the butter from the shell of the drum. The butter is not, therefore, repeatedly elevated to a considerable point and then dropped back violently to the bottom of the drum as in most, if not all, other machines of this character. It results, therefore, that not only there is better work done in my improved machine, but that the machine in the butter working action may be driven with less power than other machines of corresponding capacity. With the two series of diametrically opposite working rollers, the one series will commence action on the butter at about the time the other series has completed its action on the butter, so that the butter working action is kept up continuously with the body or bulk of the butter always close to the bottom of the drum. After the butter has been properly worked the boards 31 may be turned into the full line position in Fig. 5, and then when the drum has been given another half rotation all of the butter will be brought up above the axis of the drum and supported by a diametrically extended shelf afforded by the said boards and the working rollers. Obviously, the rollers should not be rotated during the above noted butter collecting and lifting action.

What I claim is:

1. In a combined churn and butter worker, a horizontally disposed rotary drum, provided with longitudinally spaced radially extended internal working rollers carried by said drum.

2. In a combined churn and butter worker, a horizontally disposed rotary drum, provided with longitudinally spaced radially extended internal working rollers carried by said drum, means for rotating said drum on its own axis, and means for rotating said working rollers on their own axes while traveling with said drum.

3. In a combined churn and butter worker, a horizontal rotary drum, provided with longitudinally spaced radially extended internal working rollers, and longitudinal bars carried by said drum, at the inner ends of said rollers, and to which the inner ends of said rollers are journaled.

4. In a combined churn and butter worker, a horizontal rotary drum, provided with longitudinally spaced radially extended internal working rollers, and a shelf located in said drum inward of the inner ends of said rollers.

5. In a combined churn and butter worker, a horizontal rotary drum, a plurality of sets of longitudinally spaced radially disposed working rollers within said drum, arranged for successive action on the butter, and means for rotating said drum and rollers.

6. In a combined churn and butter worker, the combination with a horizontal rotary drum, of two sets of longitudinally spaced radially disposed rollers within said drum, said two sets of rollers being located at diametrically opposite sides of the drum.

7. In a combined churn and butter worker, the combination with a horizontal rotary drum, of two sets of longitudinally spaced radially disposed rollers within said drum, said two sets of rollers being located at diametrically opposite sides of the drum, and a lifting shelf movably mounted within said drum between the inner ends of the two series of rollers.

In testimony whereof I affix my signature in presence of two witnesses.

LEONARD VIRTUE.

Witnesses:
HARRY D. KILGORE,
F. D. MERCHANT.

Copies of this patent may be obtained for five cents each, by addressing the "Commissioner of Patents, Washington, D. C."